United States Patent Office 3,273,581
Patented Sept. 20, 1966

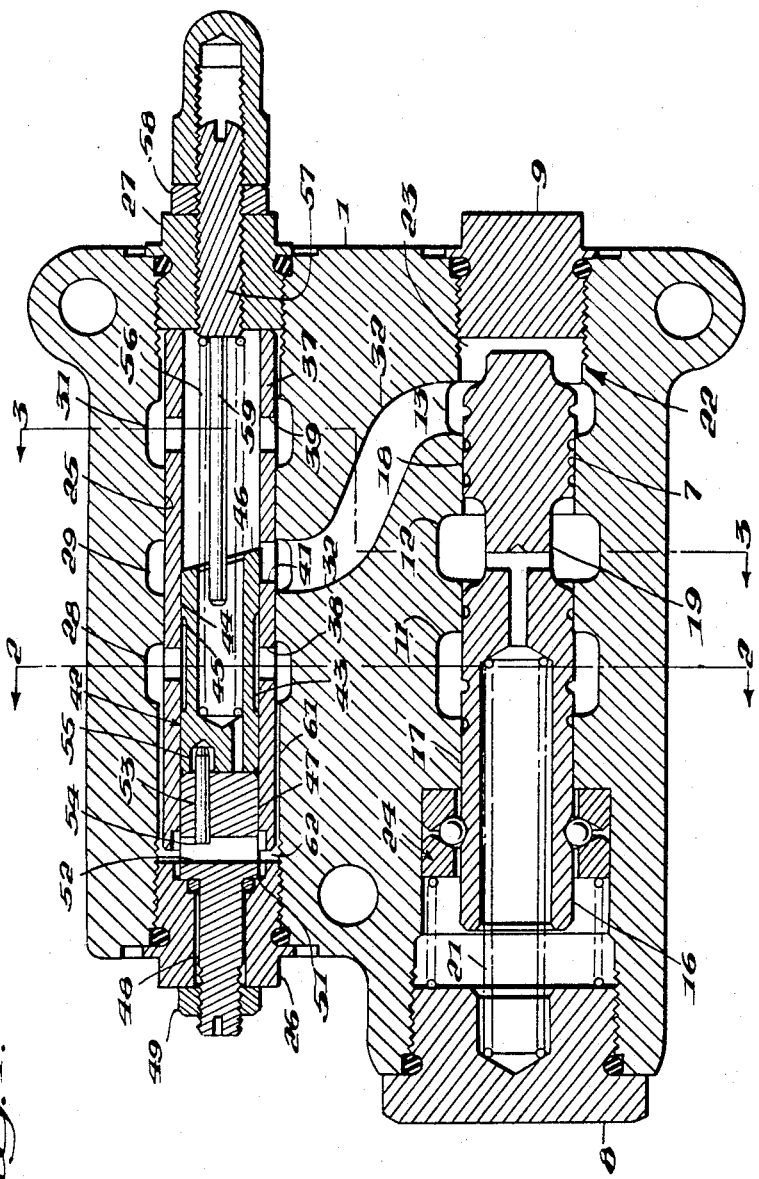

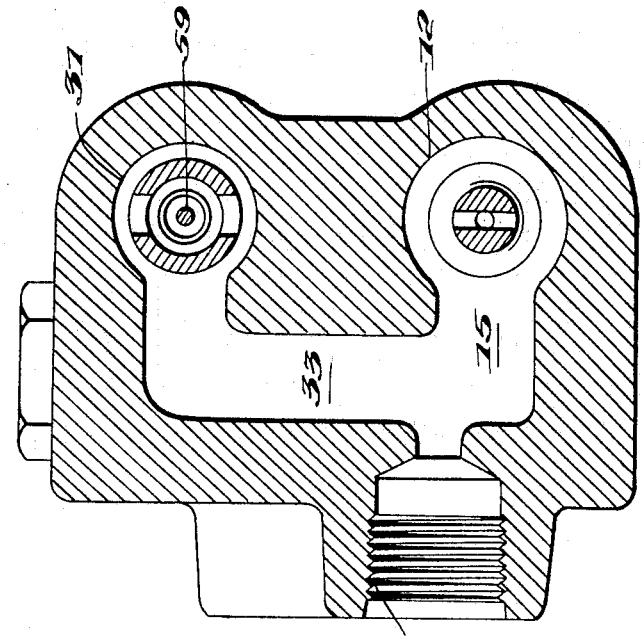
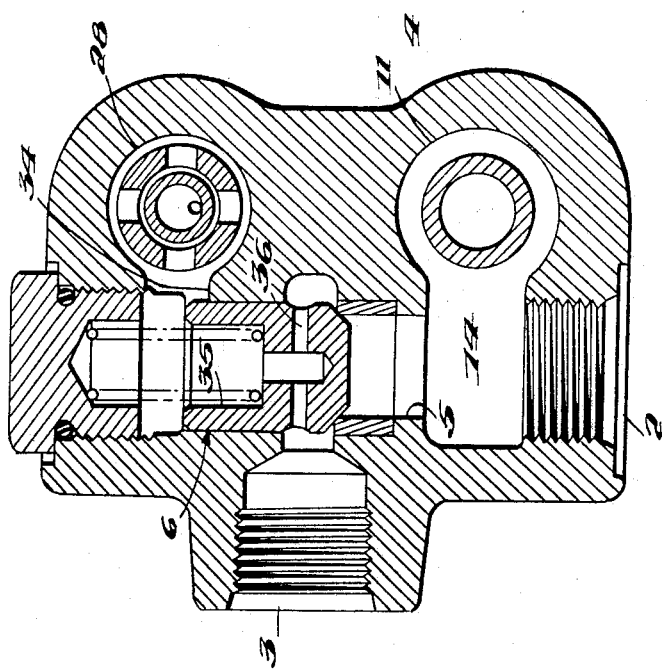

3,273,581
PILOT OPERATED UNLOADING VALVE HAVING RELATIVELY ADJUSTABLE LOADING AND UNLOADING LIMITS
Kyle E. McAfee, Jr., Lima, Ohio, assignor to The New York Air Brake Company, a corporation of New Jersey
Continuation of application Ser. No. 180,466, Mar. 19, 1962. This application Mar. 1, 1965, Ser. No. 440,663
7 Claims. (Cl. 137—108)

This application is a continuation of my co-pending application Serial No. 180,466, filed March 19, 1962, now abandoned.

This invention relates to pressure responsive pilot-operated unloading valves for hydraulic pumps.

Valves of this type usually are used in circuits employing a continuously running fixed displacement pump which is connected with the system conduit through a check valve and in which the system is provided with a pressure accumulator. The unloading valve is interposed between the pump and the check valve and is shiftable between loading and unloading positions in which it closes and opens, respectively, a flow path between the pump and a sump or reservoir. The unloading valve is biased to its loading position by a spring and is shifted to its unloading position by a fluid pressure piloted motor which is selectively connected with the sump and the system conduit by a pilot valve that responds to the pressure in the system conduit. Usually, the pilot valve is biased by a spring to a position in which the piloted motor is vented to sump and is shiftable to the pressurizing position in which the piloted motor is connected with the system conduit by a pressure motor that responds to system or accumulator pressure. When the accumulator is charged to a selected maximum pressure, the pilot valve pressurizes the piloted motor and the unloading valve unloads the pump. The pump remains unloaded until the accumulator pressure decreases to a selected minimum value and at that time the pilot valve vents the piloted motor and the unloading valve again loads the pump.

The limits of the unloading range, that is, the selected minimum and maximum pressures at which loading and unloading, respectively, occur, depend upon the bias exerted by the pilot valve spring and upon the timing of the pilot valve, i.e., the location of the points along its path of movement at which the port leading to the piloted motor is connected with and disconnected from the system conduit and the sump. Since operating conditions and system requirements vary from installation to installation it is desirable to be able to vary the magnitudes of the minimum and maximum limits of the unloading range and the differential between them. In most unloading valves, the pilot valve spring has an adjustable seat which permits the limits to be varied equal amounts, but this adjustment is not capable of varying the differential between the limits. In all prior valves of which I am aware, each limit can be changed relatively to the other only by redesigning the pilot valve so as to change its timing. Obviously this procedure is inconvenient and expensive.

The object of this invention is to provide a pressure responsive pilot-operated unloading valve in which at least one of the end limits of the unloading range can be varied independently of the other end limit. According to the preferred form of the invention, the pilot valve is a sliding plunger valve comprising a bore that receives the valve plunger and is intersected by three spaced ports, there being pressure and exhaust ports and an intermediate motor port that is connected with the piloted motor of the unloading valve. The plunger is provided with a pair of control edges that control communication between the ports, the first edge being arranged to progressively open and close the connection between the motor port and the exhaust port as the plunger moves toward its venting and pressurizing positions, respectively, and the second edge being arranged to progressively open and close the connection between the motor port and the pressure port as the plunger moves toward its pressurizing and venting positions, respectively. The first edge lies in a plane that is inclined with respect to a plane normal to the axis of the plunger and, therefore, the location of the point in the motion of the plunger at which it first opens communication between the motor port and the exhaust port depends upon the rotational position of the plunger in the bore. The valve includes means for changing this rotational position. The second control edge lies in a plane that is normal to the axis of the plunger so rotational adjustment of the plunger varies only the low limit of the unloading range. As in the conventional valve, simultaneous equal changes in the two limits is accomplished by varying the bias exerted by the pilot valve spring. However, since the effect on the low limit produced by a change in spring bias can be offset by adjustment of the rotational position of the plunger, the conventional adjustable spring seat in the preferred embodiment affords the capability of varying the upper limit relatively to the lower limit.

The preferred form of the invention will now be described in detail with reference to the accompanying drawing in which:

FIG. 1 is a cross-sectional view of the unloading valve showing the parts in the positions they assume when the valve is in loading position.

FIG. 2 is a sectional view taken on line 2—2 of FIG. 1.

FIG. 3 is a sectional view taken on line 3—3 of FIG. 1.

As shown in the drawing, the valve comprises a housing 1 containing an inlet port 2 adapted to be connected with a pump, a system port 3 adapted to be connected with an accumulator and the system conduit, and an exhaust port 4 adapted to be connected with a sump. A passage 5, containing a check valve 6, connects inlet port 2 with system port 3.

Extending through housing 1 is a valve bore 7 whose opposite ends are closed by threaded plugs 8 and 9 and which is encircled by three longitudinally spaced annular chambers 11–13. Cored passage 14 connects annular chamber 11 with inlet port 2 and cored passage 15 connects annular chamber 12 with exhaust port 4. Communication between chambers 11 and 12 is controlled by a reciprocable valve plunger 16 formed with two lands 17 and 18 separated by a groove 19. The plunger 16 is biased to the illustrated loading position in which land 17 isolates chamber 11 from chamber 12 by a coil compression spring 21, and is movable to the left, to the unloading position in which groove 19 interconnects chambers 11 and 12, by a piloted fluid pressure motor 22 comprising a working chamber 23 which is defined by valve bore 7 and plug 9 and a piston which is defined by the right end of plunger 16. The valve plunger 16 is provided with a detent mechanism 24 which insures snap action of the plunger in moving from the loading to the unloading position.

Extending through the upper part of housing 1 is a second bore 25 whose opposite ends are closed by threaded plugs 26 and 27 and which is encircled by three longitudinally spaced annular chambers 28, 29 and 31. Cored passages 32 and 33 connect annular chambers 29 and 31 with annular chamber 13 and exhaust port 4, respectively. A flow path comprising cored passage 34 and axial and radial passages 35 and 36, respectively, formed in check valve 6 establishes communication between annular chamber 28 and system port 3. A pilot valve sleeve 37 is mounted in bore 25 with a fit that prevents rotation of the sleeve relatively to the bore, and this sleeve contains two sets of spaced radial passages 38 and 39 that register with annular chambers 28 and 31, respectively, and a single intermediate radial passage 41 that registers with annular chamber 29. Communication between the radial passages is controlled by a reciprocable pilot valve plunger 42 formed with a groove 43 and a land 44 having two peripheral control edges 45 and 46. Edge 45 lies in a plane that is normal to the longitudinal axis of valve plunger 42, and edge 46 lies in a plane that is inclined with respect to a plane that is normal to the axis. The left end of sleeve 37 is closed by a cylinder body 47 having an axial extension 48 that projects through plug 26. The end of extension 48 is threaded to receive a lock nut 49, which, when tightened, forces shoulder 51 against plug 26 and locks cylinder body 47 against rotation. Cylinder body 47 is formed with a through radial passage 52 that is intersected by a longitudinal cylinder bore 53 whose axis is parallel with but eccentric to the longitudinal axis of valve plunger 42. Cylinder bore 53 contains a reciprocable piston 54 that projects into a depression 55 formed in the left end of plunger 42 in alignment with bore 53.

Valve plunger 42 is biased to the illustrated position, in which land 44 isolates radial passage 41 from radial passages 38 and passage 41 communicates with passages 39 across control edge 46, by a coil compression spring 56 having a seat 57 that is threaded into plug 27 and provided with a lock nut 58. Seat 57 is formed with an axial extension 59 that stabilizes spring 56 by preventing undue lateral deflection. Valve plunger 42 is shifted to the right to cause control edge 46 to interrupt communication between radial passage 41 and radial passages 39 and to cause groove 43 to interconnect radial passages 38 and 41 by the pressure in radial passage 52 that acts upon the left end of piston 54. Pressure is transmitted to radial passage 52 from annular chamber 28 through the annular space 61 defined by sleeve 37 and an enlarged diameter portion of bore 25 and through the space 62 between the left end of sleeve 37 and plug 26.

*Operation*

During operation inlet port 2 is connected with a hydraulic pump, system port 3 is connected with an accumulator and with the hydraulic system, and exhaust port 4 is connected with a sump. Fluid under pressure delivered to inlet port 2 passes through passage 5 and past check valve 6 to system port 3 and thence to the accumulator. Accumulator pressure in port 3 is transmitted to annular chamber 28 of the pilot valve through radial and axial passages 36 and 35, respectively, and cored passage 34, and from chamber 28 to radial passage 52 through clearance spaces 61 and 62.

When accumulator pressure is at the predetermined minimum value, the pressure force developed on piston 54 is insufficient to overcome the bias of spring 56 and valve plunger 42 assumes the illustrated position in which it vents working chamber 23 to sump along a path comprising annular chamber 13, passage 32, annular chamber 29, radial passage 41, radial passages 39, annular chamber 31, cored passage 33 and exhaust port 4. Therefore, spring 21 holds unloading plunger 16 in the illustrated loading position in which land 17 interrupts communication between annular chambers 11 and 12.

When accumulator pressure rises to a value at which piston 54 overcomes spring 56, plunger 42 commences to move to the right thereby causing control edge 46 to progressively close the connection between radial passages 41 and 39. After this connection is completely closed, further movement of plunger 42 causes control edge 45 to overtravel radial passage 41 and allow groove 43 to interconnect radial passages 38 and 41. System pressure is now transmitted to working chamber 23 where it acts on the right end of valve plunger 16 and develops a force that overpowers detent 24 and shifts plunger 16 to the left against the bias of spring 21. As plunger 16 moves to the left, land 17 uncovers annular chamber 11 and groove 19 connects this chamber with chamber 12. Opening of this flow connection unloads the pump to the sump and is accompanied by closing of check valve 6.

As the demand on the accumulator reduces its pressure below the maximum value at which unloading occurred, spring 56 commences to move pilot valve plunger 42 to the left. This movement first causes control edge 45 to interrupt communication between radial passages 38 and 41 and then, when accumulator pressure reaches the predetermined minimum value, causes control edge 46 to reopen communication between radial passages 39 and 41. At this time, the working chamber 23 is again vented to sump along the path previously mentioned and spring 21 returns unloading plunger 16 to the illustrated loading position.

The maximum accumulator pressure established by the valve depends upon the biasing force exerted by spring 56 since this force determines the pressure at which piston 54 causes control edge 45 to open communication between working chamber 23 and system port 3. The minimum accumulator pressure also depends on the biasing force exerted by the spring 56, but, in addition, it depends upon the rotational position of valve plunger 42. When plunger 42 is in the rotational position shown in the drawing, control edge 46 opens communication between radial passages 39 and 41 at a point in the movement of plunger 42 just shortly before the plunger abuts cylinder body 47. Therefore, under this condition, the valve establishes the lowest minimum pressure which it is capable of affording. In order to raise this minimum pressure relative to the maximum pressure, and thus to decrease the differential between the minimum and maximum accumulator pressures, nut 49 is loosened and cylinder body 47 is rotated. Since cylinder bore 53 is eccentric to the longitudinal axis of plunger 42, rotational adjustment of the cylinder body 47 causes piston 54 to rotate plunger 42 relatively to valve sleeve 37. Because of the inclination of control edge 46, movement of plunger 42 to a new rotational position changes the timing of the pilot valve and allows control edge 46 to open communication between radial passages 39 and 41 sooner than before. As a result, working chamber 23 will be vented, and unloading plunger 16 will move to its loading position, at an accumulator pressure higher than that established by the valve when the pilot plunger is in the illustrated rotational position. The highest minimum pressure that can be afforded by the valve will be established when the plunger 42 is in a rotational position 180° from the illustrated position.

The minimum and maximum pressures can be changed simultaneously by equal amounts (i.e., the limits of the unloading range can be changed without changing the differential between the limits) by changing the longitudinal position of spring seat 57. Screwing the seat in and out raises and lowers, respectively, the bias exerted by spring 56 and thus raises and lowers the limits of the unloading range. Furthermore, since the change in the minimum pressure produced by a change in spring bias can be offset by adjusting the rotational position of plunger 42, appropriate adjustment of both the spring bias and the rotational position of plunger 42 can produce a change in the maximum pressure relative to the minimum pressure.

In the illustrated embodiment, independent variation of the unloading limits is accomplished by rotating plunger 42 so as to vary the point at which working chamber 23 is vented. It will be apparent to those skilled in the art that the same effect can be achieved by varying the point at which working chamber 23 is pressurized, and that in lieu of using an inclined plunger control edge and providing for rotational adjustment of the plunger, the sleeve 37 can be provided with a helical passage and the sleeve rotated relatively to the plunger. It also will be apparent that the plunger can carry a pair of inclined control edges rotatable relatively to each other so that either the minimum or the maximum pressure can be varied without changing the spring bias, and that this result can also be achieved by using a pair of helical passages in a sleeve that provides for independent rotation of each passage.

As stated previously, the drawing and description relate only to the preferred form of the invention. Since changes, some of which have been mentioned, can be made in the structure of this embodiment without departing from the inventive concept, the following claims should provide the sole measure of the scope of the invention.

What is claimed is:

1. In a pressure responsive, pilot-operated unloading valve including piloted unloading valve means shiftable between loading and unloading positions under the control of a pressure responsive pilot valve means, the pilot valve means including an element shiftable to first and second control positions when the applied pressure reaches first and second values, respectively, the improvement which comprises means for adjusting said pilot valve means to vary at least one of said values relatively to the other of said values.

2. The improved unloading valve defined in claim 1 wherein the means for varying at least one of said values comprises means for varying the distance the shiftable element of the pilot valve means moves in shifting between said control positions.

3. A pilot valve for use in a pilot-operated unloader comprising casing means containing
    (a) pressure, exhaust and motor ports, and a valve member movable along a path of motion between first and second positions in which the motor port is connected with the pressure and exhaust ports, respectively;
    (b) pressure responsive means for moving said valve member between said first and second positions; and
    (c) means for varying the location of at least one of said first and second positions along said path of motion relative to the location of the other of said first and second positions.

4. A pilot valve for use in a pilot-operated unloader comprising casing means containing
    (a) pressure, exhaust and motor ports, and a valve member movable along a first path of motion between first and second positions in which the motor port is connected with the pressure and exhaust ports, respectively, at least a portion of said valve member being movable along a second path of motion to vary the location of at least one of said first and second positions along said first path of motion relative to the other of said first and second positions;
    (b) spring means biasing said valve member along said first path of motion toward one of said first and second positions;
    (c) pressure responsive means for moving the valve member along said first path of motion toward the other of said positions against the bias of the spring means; and
    (d) means for moving at least said portion of the valve member along the second path of motion.

5. The pilot valve defined in claim 4 in which the entire valve member is movable along said second path of motion and is constructed to vary the location of only one of said first and second positions relative to the other of said positions; and which includes means for varying the bias exerted by the spring means.

6. A pilot valve for use in a pilot-operated unloader comprising casing means containing
    (a) a valve bore intersected by three longitudinally spaced ports, there being a pressure port, an exhaust port and an intermediate motor port;
    (b) a valve member slidable in the bore between first and second positions in which it connects the motor port with the pressure port and the exhaust port, respectively, the valve member carrying a first control edge that progressively opens and closes communication between the motor and pressure ports as the valve member moves toward the first and second positions, respectively, and a second control edge that progressively opens and closes communication between the motor and exhaust ports as the valve member moves toward the second and first positions, respectively, one of the control edges being inclined with respect to a plane that is normal to the longitudinal axis of the valve member;
    (c) spring means biasing the valve member toward the second position;
    (d) means for varying the bias exerted by the spring means;
    (e) pressure responsive motor means for moving the valve member toward the first position against the bias of the spring means; and
    (f) adjusting means for varying the rotational position of the valve member in said bore.

7. The pilot valve defined in claim 6 in which
    (a) the pressure responsive motor means comprises
        (1) a housing positioned in said valve bore and containing a working chamber and a cylinder bore whose axis is parallel with but spaced radially from the longitudinal axis of the valve bore, and
        (2) a piston slidable in the cylinder bore and arranged to engage the valve member; and
    (b) the adjusting means comprises the piston and the housing of the pressure responsive motor means and
        (1) a depression in one end of the valve member that is eccentric with respect to the longitudinal axis of the valve member and receives the piston,
        (2) means for rotating the housing in the valve bore to a selected position, and
        (3) means for locking the housing in said selected position.

References Cited by the Examiner

UNITED STATES PATENTS

| 1,039,639 | 9/1912 | Bodwin | 137—492 |
| 2,380,705 | 7/1945 | Proctor | 137—333 |

FOREIGN PATENTS

| 586,727 | 3/1947 | Great Britain. |

WILLIAM F. O'DEA, *Primary Examiner.*

ISADOR WEIL, *Examiner.*

D. LAMBERT, *Assistant Examiner.*

UNITED STATES PATENT OFFICE
CERTIFICATE OF CORRECTION

Patent No. 3,273,581　　　　　　　　　　　　September 20, 1966

Kyle E. McAfee, Jr.

It is hereby certified that error appears in the above numbered patent requiring correction and that the said Letters Patent should read as corrected below.

Column 5, line 19, for "valves" read -- values --.

Signed and sealed this 1st day of August 1967.

(SEAL)
Attest:

EDWARD M. FLETCHER, JR.
Attesting Officer

EDWARD J. BRENNER
Commissioner of Patents